INVENTOR.
HARRY BRANSON
BY C. D. Tuska
ATTORNEY

March 27, 1951 H. BRANSON 2,546,918

RATE SMOOTHING NETWORK

Filed Nov. 29, 1944 2 Sheets-Sheet 2

INVENTOR.
HARRY BRANSON
BY C D Tuska
ATTORNEY

Patented Mar. 27, 1951

2,546,918

UNITED STATES PATENT OFFICE 2,546,918

RATE SMOOTHING NETWORK

Harry Branson, Hightstown, N. J., assignor to Radio Corporation of America, a corporation of Delaware Application November 29, 1944, Serial No. 565,778

3 Claims. (Cl. 250—27)

This invention relates to rate smoothing circuits such as are useful in minimizing rate errors due to fluctuations in the data from which the rate is derived. It has for its principal object the provision of an improved circuit and method of operation whereby a low value of effective impedance, a readily changeable time constant and a response characteristic satisfactorily approximating that required for "least square" smoothing are realized.

In the operation of fire control predictors, for example, it is necessary to derive rates from the present position data furnished by tracking. Due to tracking errors, this present position data is subject to fluctuation which results in relatively large rate errors. Hence it is necessary to smooth the rate data in order that more accurate information may be derived from it.

It is known that the rate information may be smoothed according to the method of least squares if the indicial admittance of the rate circuits and its derivative have certain characteristics. These characteristics are susceptible of approximation by practical circuits of finite extent.

Such circuits may include a differentiating element, a filter or smoothing element and a feed-back element. As hereinafter explained, the differentiating element may precede or follow the smoothing element although it is preferable that it precede the smoothing element in order to facilitate adjustment of the time constant of the smoothing element. The feed-back element is preferably made responsive to potential representative of the present position data afforded by tracking and may include compensating means whereby the impedance of the smoothing means may be maintained at a desired low value.

Important objects of the invention are the provision of an improved rate smoothing circuit having a time constant which is readily adjusted to different values; the provision of a rate smoothing circuit of low effective impedance; and the provision of a rate smoothing circuit which operates with a response characteristic satisfactorily approximating that required for least square smoothing.

The expression "least square smoothing" as here used is intended to mean that the rate at time $t$ is determined from rates existing in the interval $T-t_0$ to T by the method of least squares where $t_0$ is the smoothing time of the filter and the noise spectrum is uniform.

The invention will be better understood from the following description considered in connection with the accompanying drawings and its scope is indicated by the appended claims.

Figures 1, 2:
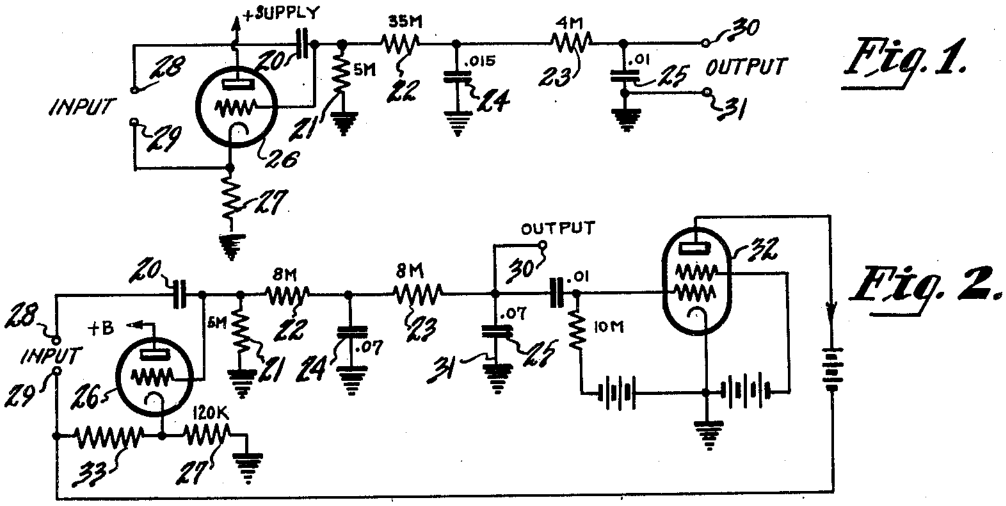
Figure 7:
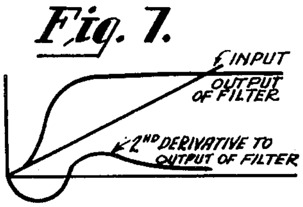
Figure 9:
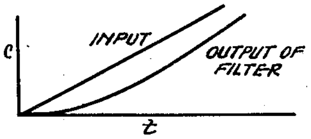
Figure 8:
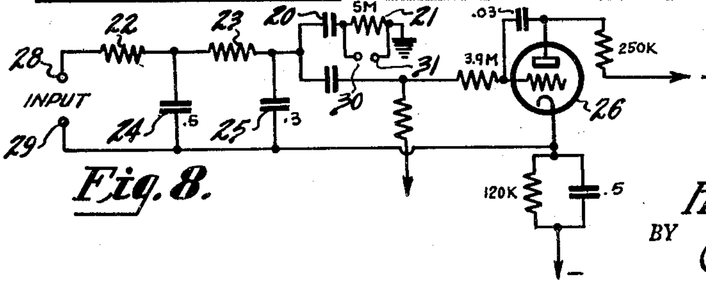
Figure 13:
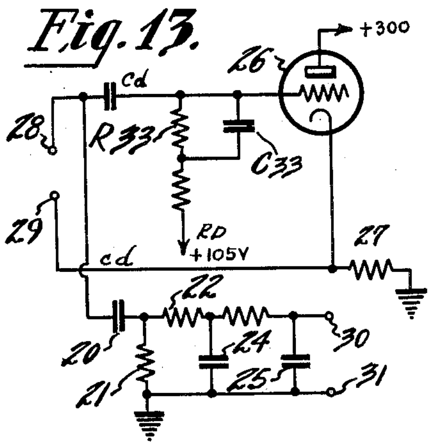
Figure 14:
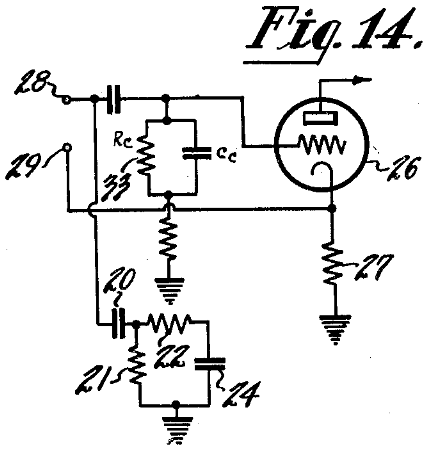
Figures 15, 16:
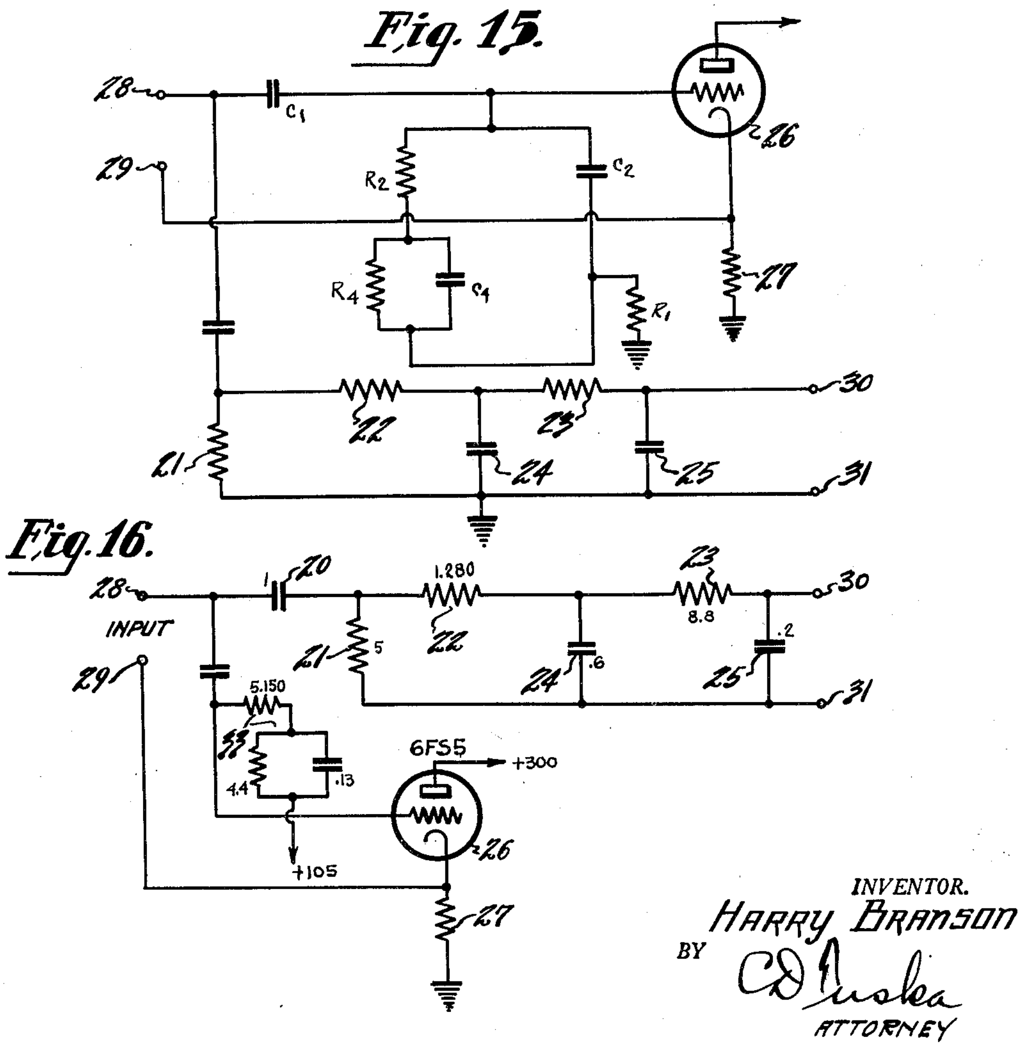

Referring to the various figures of the drawings,

Figure 1 is a more or less explanatory wiring diagram illustrating the basic features of the improved rate smoothing circuit, Figure 2 is a wiring diagram indicating how the circuit of Figure 1 may be modified to permit the introduction of such auxiliary voltages as are required to eliminate the long-time settling characteristics of the circuit of Figure 1, Figures 3 to 7 are explanatory diagrams relating to the operation of the circuit of Figure 2, Figure 8 shows the circuit of Figure 2 modified to avoid control of the derivative feed-back through a vacuum tube which, in the case of Figure 8, is replaced by a more stable network, Figures 9 to 12 are explanatory diagrams relating to the operation of the circuit of Figure 8, Figure 13 is a wiring diagram of the circuit modified to provide a simple switching scheme for changing the constant of the smoothing circuit and to provide in the feed-back path compensating means for maintaining the impedance of the smoothing filter at a desired low value, Figures 14 and 15 are explanatory diagrams relating to the operation of the circuit of Figure 13, and Figure 16 illustrates the preferred form of the invention.

The circuit of Figure 1 includes the passive differentiating circuit consisting of a capacitor 20 and a resistor 21, a filter consisting of resistors 22 and 23 and capacitors 24 and 25, and a feed-back tube 26 which has a cathode lead resistor 27 and is excited by a potential representative of the derivative of the present position or other data from which the rate is determined. Potential representative of such data is applied to the input terminals 28 and 29 and potential representative of the rate is delivered at the output terminals 30 and 31.

The relations involved in the operation of this circuit are indicated by the equation $$e_0=\frac{PR_{21}C_{20}}{1+\frac{PR_{21}C_{20}}{1+G}}e_i$$

where $e_i$=input voltage
$e_0$=voltage across resistor 21
$P=2\pi f$; $f$=frequency
G=the gain of tube 26
$R_{21}$=the resistance of resistor 21
$C_{20}$=the capacitance of capacitor 20

From this equation, it is seen that independent adjustment of the magnitude of the rate and time constant of the differentiating circuit is possible. The differentiated signal is then impressed on the filter or smoothing circuit.

For the circuit of Figure 1, the magnitude of the rate output is determined by the product $R_{21}C_{20}$. The settling times are determined by constants associated with both the differentiating circuit and the filter. In the practical case, the magnitude of the rate output is limited by the values possible for $C_{20}$ and $R_{21}$. It is found that long settling times are unavoidable if the series impedances of the smoothing filter are of the same order of magnitude as that of the resistor 21. These "tails" may be eliminated by raising the filter impedance, but here a limit determined by the leakage impedance of the apparatus driven by the output of the filter is reached. In order to realize the lower values of series impedance in the filter without the long-time settling characteristics, it is necessary to modify the circuit of Figure 1 to permit the introduction of such auxiliary voltages as are required to eliminate these long-time settling characteristics.

The circuit of Figure 2 affords one solution of this problem. It will be noted that there has been added a tube 32 which is excited by the output of the filter and functions through a resistor 33 to produce an auxiliary voltage which is impressed on the differentiator in series with the input voltage and the voltage of the resistor 27.

Figure 3:
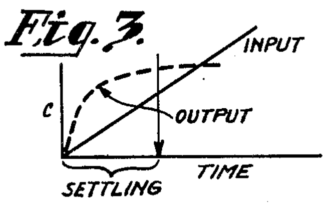
Figure 4:
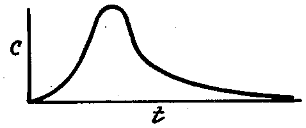
Figure 5:
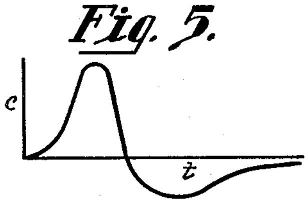
Figure 6:
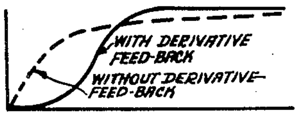

As indicated by Figure 3, the input voltage impressed on the circuit may be the uniformly rising function designated as "input." The output of the differentiator and filter without derivative feed-back is indicated by the "output" curve of Figure 3. Differentiation of the output of the filter results in a voltage wave of the forms illustrated by the curve of Figure 4. This output voltage is fed back in proper polarity to the input, differentiated and impressed on the smoothing filter in the form of a voltage of the form illustrated by Figure 5. This voltage produces in the output of the filter a voltage of the wave form shown by the full line curve of Figure 6. The combination of signals impressed on the input of the filter is indicated by the curves of Figure 7 which are self-explanatory.

By proper adjustment of the circuit constants, a much closer match to the desired characteristic can be obtained with this circuit than is possible with the basic circuit of Figure 1. Although the circuit of Figure 2 makes possible considerable improvement over the circuit of Figure 1, it has the disadvantage that the derivative feed-back is controlled by a tube which, in the interest of stability should be replaced by a more stable network. This may be accomplished by rearrangement of the circuit as shown by Figure 8.

Figure 10:
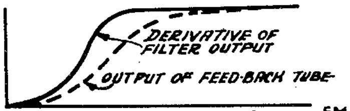
Figure 11:
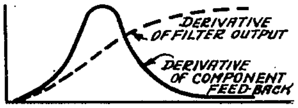
Figure 12:
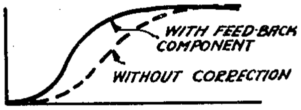

In the modified circuit of Figure 8, the filter precedes the differentiator and, for this reason, may be of low series impedance. The input voltage to the filter is linear as indicated by the "input" curve of Figure 9. The output voltage of the filter impressed on the differentiator corresponds to the "out of filter" curve of Figure 9. The derivative of the output voltage of the filter is shown in Figure 10. The feed-back tube has delay networks in its grid and cathode circuits so that the voltage fed back to the input of the filter has the form shown in Figure 10. The voltage appearing across the differentiating resistor 21 due to this feed-back voltage is shown in Figure 11. The resulting voltage across the differentiating resistor is of the form shown by Figure 12.

By proper proportioning of the circuit constants, a very close approximation to the desired smoothing characteristic may be realized with the circuit of Figure 8. However, this circuit has the disadvantage that its tone constants cannot be readily changed without introducing transient disturbances. This follows from the fact that the filter is in effect a present position filter and all its series elements are carrying current while the voltage across its shunt elements is a linear function of time after the initial transient disturbance has died away.

In order to provide a simple switching scheme for changing the time constants of the smoothing circuits, it is necessary to have the filter follow the differentiator. The impedance of the smoothing filter may be maintained at a desirable low value by the use of proper compensation means in the feed-back circuit. This is accomplished by the circuit of Figure 13.

In the circuit of Figure 13, compensation is obtained by the shunt RC circuit 33 provided in the grid circuit of the feed-back tube 26. Basically, this compensation circuit in the grid connection of the feed-back tube forces the voltage of the resistor 21 to be a true derivative of the input voltage in spite of the loading of the differentiator by the filter. This is shown by consideration of the circuit of Figure 14.

Assuming that the feed-back tube 26 of Figure 14 has very high gain and that a linearly rising signal voltage is impressed on its grid, the current driven through the capacitor 20 will be $\rho C_{20}e_1$ where $\rho=2\pi f$, $C_{20}$=capacitance of the capacitor 20 and $e_1$=input voltage. Hence the voltage applied to the input of the filter is $$V=Kt+R_{21}K1+\frac{R_{33}K1}{PR_{33}C_{33}+1}$$

↙ Voltage component of condenser; ↓ Voltage component due to resistor; ↘ Voltage component of compensation network where $Kt$=input voltage,
$R_{21}$=resistance of resistor 21,
$R_{33}$=resistance of the resistor in the compensation network,
$C_{33}$=capacitance of the capacitor in the compensation network,
1=unit function,
and
K=slope of input wave front.

If the voltage applied to the resistor 21 is a true derivative of the input signal applied to the terminals 28 and 29, the resultant voltage applied to the differentiator and filter is $$V=Kt+R_{21}K1+\frac{1}{\rho C_{20}}\frac{PC_{24}R_{21}K1}{\rho R_{22}C_{24}+1}$$

It is easily seen that compensation is obtained if the following conditions are satisfied $$R_{22}C_{24}=R_{33}C_{33}$$
$$C_{24}R_{21}=R_{33}C_{20}$$

In the more complex case of the two-stage filter for the smoothing networks, the compensation circuit is preferably of the form shown by Figure 15. Here the conditions for compensation are that $$R_{22}C_{24}=R_2C_2$$
$$R_{23}C_{25}=R_4C_4$$

and $$R_{22}C_{25}=R_4C_2$$

In the practical use of the invention, it has been found that somewhat better results are obtained if the conditions outlined above are not strictly met, since a certain degree of smoothing may be derived from the feed-back tube circuits when its gain is properly adjusted. Also satisfactory compensation for a two-stage filter may be secured by the compensation means of Figure 14 if sufficient stagger is permitted in the impedance sections.

The preferred arrangement of the various elements is shown by Figure 16. In this case, the compensating voltage for maintaining the filter impedance at a desirable low value is produced in the derivative feed-back circuit and applied to the input terminals of the differentiating circuit which delivers its output to the filter.

What is claimed is:

1. In a system for minimizing error in a rate derived from data subject to extraneous fluctuations, the combination of a differentiating circuit including an output impedance, means for applying potential representative of said data to the input of said differentiating circuit, a smoothing circuit connected across the output impedance of said differentiating circuit and having series impedances of a value of the same order as the output impedance of said differentiating circuit, and a derivative feed-back circuit connected to apply to the input of said differentiating circuit a compensating voltage such that the settling time of said smoothing circuit is reduced to a desired value.

2. In a system for minimizing error in a rate derived from data subject to extraneous fluctuations, the combination of a differentiating circuit including an output resistor, means for applying potential representative of said data to the input of said differentiating circuit, a smoothing circuit connected across said output resistor and having series resistors of the same order of value as said output resistor, and a derivative feed-back circuit connected to apply to the input of said differentiating circuit a compensating voltage whereby the settling time of said smoothing circuit is minimized.

3. In a system for minimizing error in a rate derived from data subject to extraneous fluctuations, the combination of a differentiating circuit including an output impedance, means for applying to the input of said differentiating circuit potential representative of said data, a smoothing circuit connected across said output impedance and having series impedances of the same order of value as said output impedance, and a derivative feed-back circuit wherein a triode having a cathode lead resistor has its cathode connected to one input terminal of said differentiating circuit and has its grid coupled to the other input terminal of said differentiating circuit and shunted by a resistance-capacitance circuit.

HARRY BRANSON.

REFERENCES CITED

The following references are of record in the file of this patent:

UNITED STATES PATENTS

| Number | Name | Date |
|---|---|---|
| 2,251,973 | Beale et al. | Aug. 12, 1941 |
| 2,415,430 | Frische et al. | Feb. 11, 1947 |
| 2,435,195 | Bomberger et al. | Feb. 3, 1948 |